C. C. REDMOND & A. W. WHITE.
Faucet.

No. 224,354.  Patented Feb. 10, 1880.

Attest:
J. Walter Fowler
W. F. Morsell

Inventors
Chas. C. Redmond
Archibald W. White
by A. H. Evans & Co.
Attorneys

UNITED STATES PATENT OFFICE.

CHARLES C. REDMOND AND ARCHIBALD W. WHITE, OF SAN JOSÉ, CAL.

FAUCET.

SPECIFICATION forming part of Letters Patent No. 224,354, dated February 10, 1880.

Application filed December 17, 1879.

*To all whom it may concern:*

Be it known that we, CHAS. C. REDMOND and A. W. WHITE, of San José, county of Santa Clara, State of California, have invented a new and Improved Beer-Faucet; and we do hereby declare the following to be a full, clear, and exact description thereof, reference being had to the accompanying drawings, making part of this specification, in which—

Figure 1:
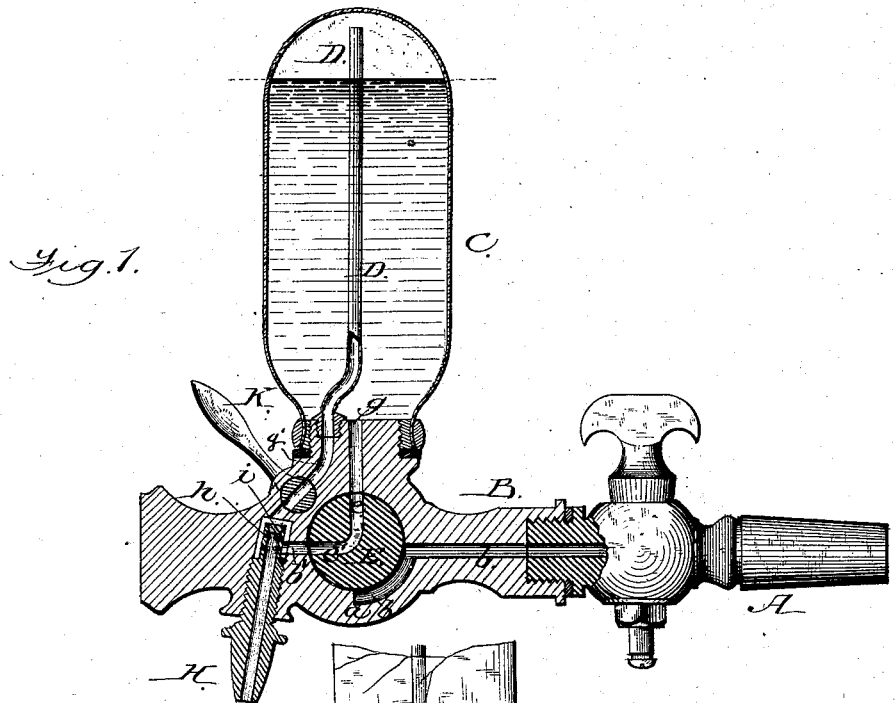
Figure 2:
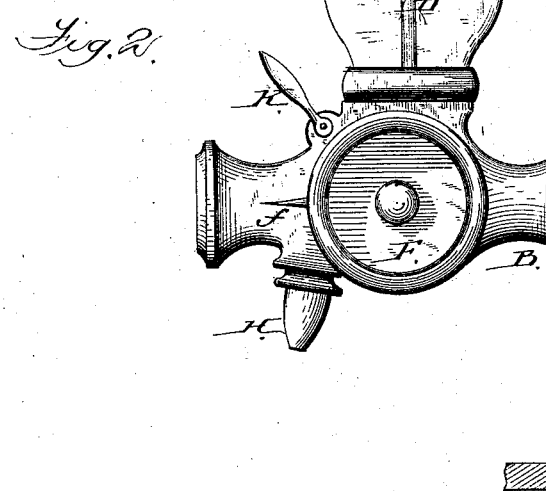

Figure 1 is a side elevation of our improved faucet, partially in section. Fig. 2 shows the faucet as applied above the counter when the cask is below.

The object of our invention is to supply a faucet whereby a glass of beer or other fermenting liquor may be drawn without having the glass partially filled with the foam, as is the case with all faucets now in use, and without passing air into the cask or allowing gas to escape, thereby keeping the beer good and under pressure until the contents are used up; and it consists of the combination of devices hereinafter described and claimed.

In the drawings, A represents the stem of a faucet, which is driven into the cask; or it may be connected with the cask, as shown in Fig. 2, the cask being located beneath the counter for convenience.

The faucet B is provided at its upper side with a glass or other suitable globe, C, into which extends the tube D to a point near its top.

The cock E has two passage-ways, $e$ $e'$, its center meeting at or about a right angle, as shown in Fig. 1. This cock is operated by the circular plate F on its outer end, which plate is provided with a pointer, $f$, to indicate the particular position of the passages $e$ $e'$.

Through the rear portions of the faucet is made the opening or passage $b$, to admit the beer or other liquid from the cask. This opening $b$ extends to and in contact with the cock E, and continues a quarter of a circle below and under the cock to a point, $a$, for the purpose hereinafter explained.

The passage $g$ extends from the top of the faucet, and at a point within the globe C, down to a point in contact with the cock E.

In the front of the cock, and on a plane with the passage $b$, is a passage, $b'$, leading from the cock forward to a point in contact with the discharge-nozzle H. This nozzle screws into the faucet, and is provided at its upper end with a perforated cap, $h$, through which the beer enters the nozzle after it has passed from the opening $b'$ into the chamber $i$, surrounding the cap.

The tube D passes down into the forward portion of the faucet, and, through the passage $g'$, communicates with the chamber $i$, and is provided with a stop-valve, K, so as to cut off communication between the globe C and chamber $i$.

It is evident that when the cock E is turned so as to bring the opening $e$ on the line with the passage $b$ the opening $e'$ will be in line with the passage $g$, and thus a free communication will be opened for the passage of the beer from the cask into the globe C, and the globe will become filled with the liquid only to a point below the upper end of the tube D, as shown in Fig. 1, as the accumulation of gas in the upper part of the globe will arrest the rise of the beer at about that point. In this position several glasses of beer may be held in the globe, ready to be drawn off. Now, if the cock be turned so as to bring the opening $e$ on a line with the passage $g$, the opening $e'$ will be in line with the passage $b'$, and the beer in the globe will run off under pressure of the gas in the top of the globe, and no gas will escape nor any air be admitted into the cask.

If desired, the gas can be discharged through the tube D by opening the valve K.

Again, it is evident from the construction described that if the opening $e$ be brought into line with the passage $b'$ the opening $e'$ will be in contact with the passage $b$ at the point $a$, and thus open a free communication between the cask and the discharge-nozzle H without passing through the globe.

Having thus described our invention, what we claim as new, and desire to secure by Letters Patent, is—

The improved faucet described, consisting of the body B, provided with the passages $b$, $b'$, and $g$, and the globe C, in combination with the cock E, provided with the openings $e$ $e'$, the tube D, provided with the valve K, and the nozzle H, all constructed to operate substantially as and for the purpose set forth.

CHAS. C. REDMOND.
    ARCHIBALD W. WHITE.

Witnesses:
 J. E. BROWN,
 A. E. MOODY.